US007020327B2

(12) United States Patent
Tack-don et al.

(10) Patent No.: US 7,020,327 B2
(45) Date of Patent: Mar. 28, 2006

(54) MACHINE READABLE CODE IMAGE AND METHOD OF ENCODING AND DECODING THE SAME

(75) Inventors: Han Tack-don, Seoul (KR); Cheong Cheol-ho, Seoul (KR); Lee Nam-kyu, Goyang (KR); Shin Eun-dong, Seoul (KR)

(73) Assignee: ColorZip Media, Inc., Seoul (KR)

( * ) Notice: Subject to any disclaimer, the term of this patent is extended or adjusted under 35 U.S.C. 154(b) by 713 days.

(21) Appl. No.: 09/739,698

(22) Filed: Dec. 20, 2000

(65) Prior Publication Data

US 2002/0028015 A1 Mar. 7, 2002

(30) Foreign Application Priority Data

May 9, 2000 (KR) ............... 2000-24706

(51) Int. Cl.
*G06K 9/00* (2006.01)
(52) U.S. Cl. .................. 382/162; 382/274; 235/469; 235/494
(58) Field of Classification Search ........... 235/468, 235/470, 494; 348/222.1–230.1; 358/29, 358/40, 41; 382/162, 274
See application file for complete search history.

(56) References Cited

U.S. PATENT DOCUMENTS

| 4,235,551 A | * | 11/1980 | Harvey ................ 355/38 |
| 4,506,290 A | * | 3/1985 | Hashimoto ............ 348/225.1 |
| 5,369,261 A | * | 11/1994 | Shamir ................ 235/469 |
| 5,426,289 A | | 6/1995 | Kinoshita et al. |
| 5,818,032 A | * | 10/1998 | Sun et al. ............ 235/494 |
| 5,869,828 A | | 2/1999 | Braginsky |
| 6,119,940 A | | 9/2000 | Klug |
| 6,354,502 B1 | | 3/2002 | Hagstrom et al. |
| 6,459,449 B1 | * | 10/2002 | Juen .................. 348/223.1 |
| 6,466,334 B1 | * | 10/2002 | Komiya et al. .......... 358/1.9 |

FOREIGN PATENT DOCUMENTS

| JP | 6102476 | 2/1986 |
| JP | 63240688 | 10/1988 |
| JP | 01126794 | 5/1989 |
| JP | 4148376 | 5/1992 |
| JP | 5020479 | 1/1993 |
| JP | 6111084 | 4/1994 |
| JP | 7282183 | 10/1995 |
| JP | 11254802 | 9/1999 |
| JP | 2000322531 | 11/2000 |

* cited by examiner

Primary Examiner—Kanjibhai Patel
Assistant Examiner—Yubin Hung
(74) Attorney, Agent, or Firm—Nixon & Vanderhye P.C.

(57) ABSTRACT

A machine readable code, a code encoding method and device and a code decoding method and device are provided. This machine readable code includes a data area made up of at least one data cell, in which different colors or shades are encoded and expressed depending on the content of the information, and a parity area made up of at least one parity cell, the parity area provided to determine whether colors or shades expressed in the data cells have been properly expressed depending on the content of the information. Since this code image includes a parity area for parity inspection, mal-recognition of colors due to differences between input devices such as cameras or between the environments such as light can be easily detected and corrected.

6 Claims, 13 Drawing Sheets

FIG. 2B

| | Number & Special Characters | | | Alphabet (Upprt-case letter) | | | Alphabet(Lower-case letter) | | |
|---|---|---|---|---|---|---|---|---|---|
| | char | color | code | char | color | code | char | color | code |
| 1 | 0 | | 000 000 | A | | 001 011 | a | | 100 101 |
| 2 | 1 | | 000 001 | B | | 001 100 | b | | 100 110 |
| 3 | 2 | | 000 010 | C | | 001 101 | c | | 100 111 |
| 4 | 3 | | 000 011 | D | | 001 110 | d | | 101 000 |
| 5 | 4 | | 000 100 | E | | 001 111 | e | | 101 001 |
| 6 | 5 | | 000 101 | F | | 010 000 | f | | 101 010 |
| 7 | 6 | | 000 110 | G | | 010 001 | g | | 101 011 |
| 8 | 7 | | 000 111 | H | | 010 010 | h | | 101 100 |
| 9 | 8 | | 001 000 | I | | 010 011 | i | | 101 101 |
| 10 | 9 | | 001 001 | J | | 010 100 | j | | 101 110 |
| 11 | | | | K | | 010 101 | k | | 101 111 |
| 12 | Space | | 001 010 | L | | 010 110 | l | | 110 000 |
| 13 | Toggle | | 111 111 | M | | 010 111 | m | | 110 001 |
| 14 | | | | N | | 011 000 | n | | 110 010 |
| 15 | | | 100 | O | | 011 001 | o | | 110 011 |
| 16 | | | 010 | P | | 011 010 | p | | 110 100 |
| 17 | | | 001 | Q | | 011 011 | q | | 110 101 |
| 18 | RED | | 110 | R | | 011 100 | r | | 110 110 |
| 19 | GREEN | | 101 | S | | 011 101 | s | | 110 111 |
| 20 | BLUE | | 011 | T | | 011 110 | t | | 111 000 |
| 21 | YELLOW | | 111 | U | | 011 111 | u | | 111 001 |
| 22 | MAGENTA | | 000 | V | | 100 000 | v | | 111 010 |
| 23 | CYAN | | | W | | 100 001 | w | | 111 011 |
| 24 | WHITE | | | X | | 100 010 | x | | 111 100 |
| 25 | BLACK | | | Y | | 100 011 | y | | 111 101 |
| 26 | | | | Z | | 100 100 | z | | 111 110 |

FIG. 2C
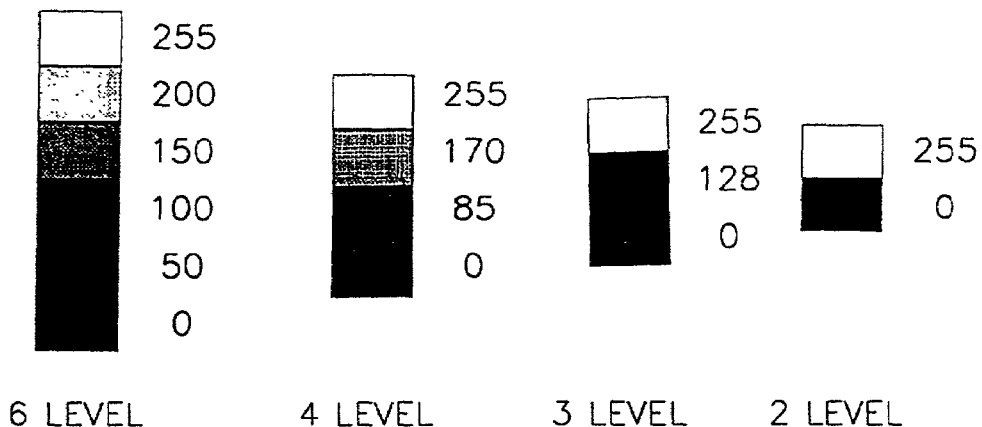
6 LEVEL  4 LEVEL  3 LEVEL  2 LEVEL
FIG. 2D
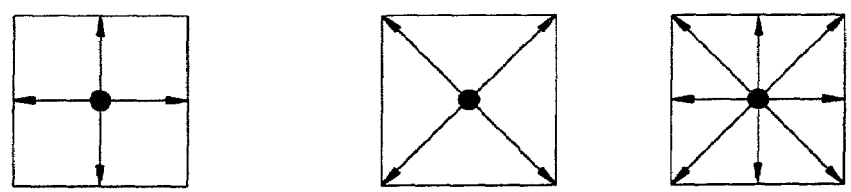
FIG. 2E
| N | PATTERN |
|---|---------|
| 0 | □ |
| 1 | (4 patterns) |
| 2 | (6 patterns) |
| 3 | (4 patterns) |
| 4 | ⊞ |

FIG. 3A

| D11 | D12 | D13 | D14 | P1 |
|-----|-----|-----|-----|-----|
| D21 | D22 | D23 | D24 | P2 |
| D31 | D32 | D33 | D34 | P3 |
| D41 | D42 | D43 | D44 | P4 |

FIG. 3B

| D11 | D12 | D13 | D14 | P1 |
|-----|-----|-----|-----|-----|
| D21 | D22 | D23 | P2 | D24 |
| D31 | D32 | P3 | D33 | D34 |
| D41 | P4 | D42 | D43 | D44 |

FIG. 3C

| D11 | D12 | D13 | D14 |
|-----|-----|-----|-----|
| D21 | D22 | D23 | D24 |
| D31 | D32 | D33 | D34 |
| D41 | D42 | D43 | D44 |
| P1  | P2  | P3  | P4  |

FIG. 3D

| D11 | D12 | D13 | D14 |
|-----|-----|-----|-----|
| D21 | D22 | D23 | P4  |
| D31 | D32 | P3  | D24 |
| D41 | P2  | D33 | D34 |
| P1  | D42 | D43 | D44 |

FIG. 3E

| D11 | D12 | D13 | D14 | P1r |
|-----|-----|-----|-----|-----|
| D21 | D22 | D23 | D24 | P2r |
| D31 | D32 | D33 | D34 | P3r |
| D41 | D42 | D43 | D44 | P4r |
| P1c | P2c | P3c | P4c | Prc |

| INDEX | SERVICE CODE | OFFSET | TARGET INFORMATION (CONTENT) |
|---|---|---|---|
| 1 | 1 | 100 | http://www.ibm.com |
| ⋮ | ⋮ | ⋮ | ⋮ |
| 1200 | 2 | 244 | http://www.samsung.com |
| 1201 | 4 | 1048 | http://www.yonsei.ac.kr |
| ⋮ | ⋮ | ⋮ | ⋮ |

FIG. 10

MACHINE READABLE CODE IMAGE AND METHOD OF ENCODING AND DECODING THE SAME

BACKGROUND OF THE INVENTION

1. Field of the Invention

The present invention relates to a machine-readable code image and a method and apparatus for encoding and decoding the code image, and more particularly, to a method and apparatus for encoding data into a code using the arrangement of cells expressed in various colors or shades and decoding the encoded code using a computer and its peripheral devices.

2. Description of the Related Art

Recently, a bar code consisting of lines having various thicknesses has been printed on most products circulating in the open market in order to represent product information such as the type and price of a product. A bar code is made up of thick lines, thin lines and double lines to represent numerical data in which product information is encoded.

The home page address or uniform resource location such as the E-mail address of a company is usually printed on a business card for the purpose of general business. Internet home pages contain the promotional contents of companies. When Internet users are interested in a company, they read the promotional contents of the company contained in its Internet home page, and then try contacting the company through its E-mail address when they have an inquiry to make. In some cases, the home page address or URL of a specific company is also printed on the advertisement section of magazines or newspapers besides on the business card of the company. Also, published books can have Internet home page addresses of companies printed thereon.

In these cases, if a user wants to contact the URL printed on the business card of a company, the URL on the business card, for example, http://comsciyonsei.ac.kr/~nklee, must be typed through a keyboard. Also, if the E-mail address, for example, nklee@yonsei.ac.kr. is printed on the business card of a company, users trying to send messages to the E-mail address must type the entire E-mail address.

However, Internet home page addresses or E-mail addresses do not consist of one or two letters but generally of over ten letters to several tens of letters. Thus, inputting the home page addresses or E-mail addresses can be a burden to users.

In order to solve this problem, U.S. Pat. No. 5,869,828 entitled "Color and shape system for encoding and decoding data" has been proposed. U.S. Pat. No. 5,869,828 discloses a method and system for encoding/decoding character data Printers may have different printing characteristics, so that a color figure may be printed in different colors depending on the type of printers. That is, if an item of data is encoded into a color figure and the color figure is printed by printers provided by different companies, the shades of the printed color figures may vary depending on the characteristics of each of the printers. Accordingly, in U.S. Pat. No. 5,869,828, even when an identical color figure is printed, different color figures may be obtained due to differences in the printing environment, so that it is likelihood that the original data encoded in a color figure may not be correctly decoded.

SUMMARY OF THE INVENTION

To solve the above problem, an objective of the present invention is to provide a machine readable code including parity information as well as objective data when information is expressed as a code.

Another objective of the present invention is to provide a method and apparatus for encoding predetermined information into the above-described code.

Still another objective of the present invention is to provide a method and apparatus for decoding a code encoded by the above encoding method to extract the original information.

Yet another objective of the present invention is to provide a computer-readable recording medium which records a program for accomplishing the encoding and decoding methods.

To achieve the first objective, the present invention provides a machine readable code for representing information, including: a data area made up of at least one data cell, in which different colors or shades are encoded and expressed depending on the content of the information; and a parity area made up of at least one parity cell, the parity area provided to determine whether colors or shades expressed in the data cells have been properly expressed depending on the content of the information.

To achieve the second objective, the present invention provides a method of encoding a code image, including: (a) setting up a code conversion table in which different colors or shades are mapped according to recognizable characters including numerals and symbols; (b) setting target data to be encoded; (c) encoding the target data using the code conversion table and forming a data area with an image formed in a series of colors or shades; (d) setting up a parity area for determining whether the image formed in the data area is suitable for the target data; and (e) obtaining a physical or electronic code image from the image for the data area and the parity area.

To achieve the second objective, the present invention provides a code image encoding device including: a storage unit for storing a code conversion table in which different colors or shades are mapped according to recognizable characters including numerals and symbols; a data area formation unit for receiving target data to be encoded and encoding the target data using the code conversion table to form an image to be expressed on a data area; a parity area formation unit for forming a parity area for determining whether the image formed in the data area is suitable for the target data upon decoding; and a code image formation unit for forming a physical or electronic code image from the image formed on the data area and the parity area.

To achieve the third objective, there is provided a code image decoding method according to an embodiment of the present invention, including: (a) receiving a code image including a data area in which target data is encoded and expressed as an image in colors or shades and a parity area for determining whether the image formed in the data area is suitable for the target data; (b) discerning the data area and the parity area in the code image from each other; (c) recognizing colors or shades from the images expressed in the data area and the parity area; (d) calculating a first parity value using the colors or shades recognized from the image in the data area; (e) calculating a second parity value using the colors or shades recognized from the image in the parity area, and comparing the second parity value with the first parity value; and (f) decoding the encoded image using colors or shades recognized from the data area and extracting target data made up of recognizable characters including numerals and symbols, if it is determined that there are no parity errors.

To achieve the third objective, there is provided a code image decoding method according to another embodiment of the present invention, including: (a) receiving a code image including a data area in which target data is encoded and expressed as an image in colors or shades and a parity area for determining whether the image formed in the data area is suitable for the target data; (b) discerning the data area and the parity area in the code image from each other; (c) recognizing colors or shades from the images expressed in the data area and the parity area; (d) setting parameters for normalizing colors or shades recognized from the code image in consideration of an environment where the code image has been read; (e) normalizing a color or shade recognized from the code image on the basis of the parameters, and obtaining a code value for the data area and the parity area; (f) calculating a first parity value using the code values for the data area; (g) calculating a second parity value using the code values for the parity area; (h) determining whether there are no parity errors, by comparing the first parity value with the second parity value; and (i) re-setting the parameters and repeating the above-described steps from the step (e), if parity errors are generated.

To achieve the third objective, there is provided a code image decoding device including: a storage unit for storing a code conversion table on which different colors or shades are mapped according to recognizable characters including numerals and symbols; an input unit for receiving a code image including a data area in which target data is encoded and expressed as an image in colors or shades and a parity area for determining whether the image formed in the data area is suitable for the target data, the code image encoded according to the code conversion table; an information discerning unit for distinguishing between a data area and a parity area of the code image and discriminating between the colors or shades of the cells expressed in the data area and the parity area; a parity comparison unit for calculating a first parity value depending on the colors or shades recognized from the image of the data area, calculating a second parity value depending on the colors or shades recognized from the image of the parity area, and comparing the second parity value with the first parity value; and a data extraction unit for extracting target data made up of recognizable characters including numerals and symbols by decoding the received code image depending on the colors or shades recognized from the data area according to the code conversion table, if it is determined from the comparison by the parity comparison unit that there is no parity error.

BRIEF DESCRIPTION OF THE DRAWINGS

The above objectives and advantage of the present invention will become more apparent by describing in detail preferred embodiments thereof with reference to the attached drawings in which:

FIG. 2B shows an example of a code conversion table where various characters are converted into code images, FIG. 2C shows an example of a grayscale code, and FIGS. 2D and 2E show an example of a pattern that can be expressed on each of the cells of a code image;

FIGS. 3A through 3F show various examples of the location of a parity area within a rectangular matrix-type code image;

FIG. 4 shows the structure of a database which stores index information;

FIG. 10 shows an example of an advertisement on which a code image is printed according to the present invention.

DESCRIPTION OF THE PREFERRED EMBODIMENTS

Figures 1, 2A:
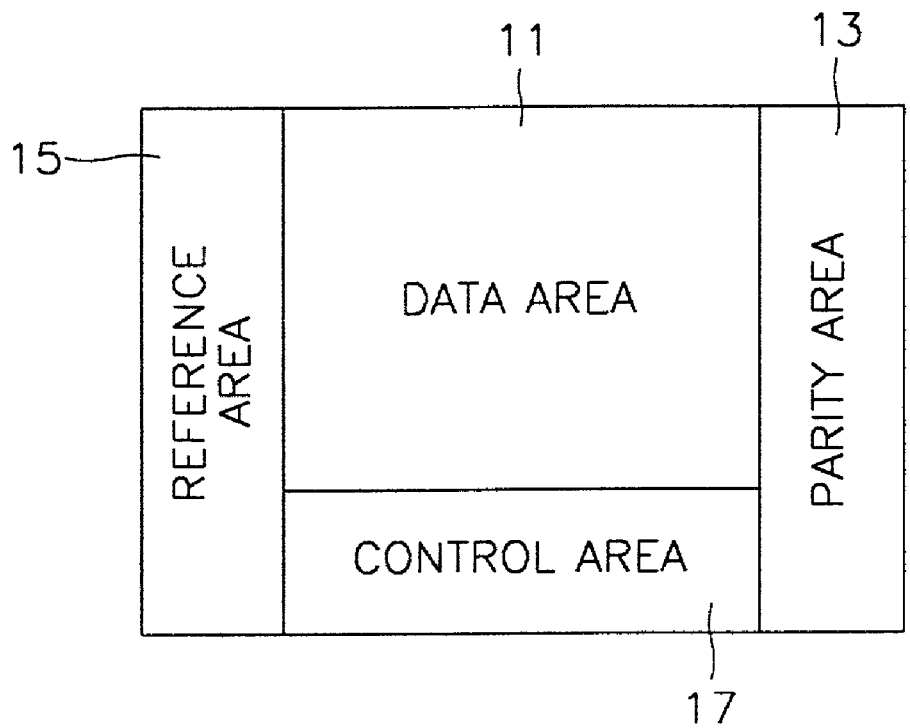
FIG. 1 is a view illustrating the structure of a machine-readable code according to the present invention.
FIG. 2A shows an example of expressing four colors using two bits.

FIG. 1 shows the structure of a code formed as an image so that target information can be read by machines, according to the present invention. Referring to FIG. 1, this code includes at least two areas each having at least one cell. That is, the code includes a data area 11 formed with at least one data cell encoded and expressed in different colors or shades depending on the content of information, and a parity area 13 formed with parity cells for performing recognition error inspection with respect to the cells within the data area 11.

The code can further include a reference area 15 and a control area 17. The reference area 15 is formed with at least one reference cell which provides a reference color or reference shade for judging the color or shade of the data cell formed in the data area 11. The control area 17 is formed with at least one control cell which indicates a command or service capable of being provided using the information indicated in the data area 11.

Preferably, the code further includes a boundary area for defining the areas between the areas included in the code. Also, a boundary area can be further included between the cells included in each of the regions, in order to define cells. The boundary area can be made up of a line or cell having a specific color or pattern, and a boundary line or boundary area can be black or white. The areas can also be distinguished from each other by a certain range of a color or shade differently set for the cells of each of the data area, the parity area, the reference area and the control area, or by inserting an individual specific pattern into the cells of each of the areas.

The data area 11 is made up of at least one data cell in which a character or the like is encoded into an image. A data cell can be configured so as to represent information such as a single character, or a set of data cells can be configured so as to represent one or more items of information. For example, a character A can be expressed as a single red cell or as two cells, for example, a red cell and a green cell.

Target information contained in the data area 11 is made up of characters, numerals and symbols, and can be a variety of information such as a name, an address, a telephone number, a facsimile number, the host address of a network, domain names and IP addresses used on the Internet, a URL, a protocol, or a document name, depending on the need of users.

The parity area 13 is provided to be used upon decoding to determine whether colors or shades expressed in the data cells of the data area 11 are suitable for the content of target information. Parity data is obtained according to the code values corresponding to the colors or shades expressed in the data cells, and parity cells are formed by the colors or shades for the parity data. Various examples of the location of parity cells within a code image are shown in FIGS. 3A through 3F.

The reference area 15 is used to set a reference color (or a reference shade) for recognizing the colors (or shades) expressed in the cells in the data area 11 and/or the control area 17. The colors of the cells expressed in each of the areas are based on at least one model of a red blue green (RGB) color model, a hue saturation value (HSV) color model and the like. Also, when a code is formed in a black and white shade (gray scale), the information of each cell can be accurately ascertained on the basis of black and/or white expressed in the reference area 15.

A color can be printed differently depending on the type of printer or the material used in the printing paper, and the same color can be recognized somewhat differently depending on the characteristics of a scanner or camera. In consideration with this fact, the reference cells in the reference area 15 provide a standard for determining a color expressed on the data area. That is, even when a color is differently printed due to the difference in characteristics between output devices, or when a color is differently recognized due to the difference in characteristics between input devices such as a scanner, the color of each of the cells in the data area 11 can be accurately recognized since the color difference between the reference area 15 and the data area 11 is fixed. Therefore, the color of each of the cells can be obtained by the comparison with the reference color of the reference area 15 on the basis of the RGB model or HSV model, so that the information of a data cell can be accurately recognized even if an image input device or an image output device is changed.

Users can receive various services depending on the type of application field using the target information of the data area 11. For example, if an Internet home page address (that is, a URL) is expressed as a code image on a business card, a program can be provided so that a code image is decoded by a computer, and then a web browser of the computer or a server computer connected to the computer is executed to allow users to be connected to the home page. Also, if an Internet E-mail address is expressed as a code image on a business card, the code image is decoded by a computer, and then the mailing software of the computer is executed, to provide an environment where a mail can be sent to the E-mail address. Here, this automatic service function can be automatically executed by a separate program or by a decoding program depending on the type of target information. Also, a code image includes the control area 17 on which this command word is expressed as an image, so that the automatic service function can be executed by a decoding program using control information decoded by the control area 17.

The control area 17 can include a command or meta-data for controlling the target information of the data area. For example, the information expressed on the control area 17 can include various meta-data such as the sequence of decoding of the cells formed in the data area 11, the location of the reference cells of the reference area 15 that is a standard of judgement of the colors of the data cells formed on the data area 11, the location or properties of the parity area 13, and the like.

FIG. 2A shows an example of expressing four colors using two bits. If each cell can have one among four colors, 2-bit data can be expressed using one color cell. Hence, if 4 consecutive cells are defined to express one character, $2^8$, that is, 256 characters, can be expressed. FIG. 2B shows an example of a code conversion table where various characters (alphabet or special characters), numerals or figures are converted into color images. Here, one character is mapped to two color cells.

In an encoding method using the code conversion table of FIG. 2B, various characters or the like are converted into code values, and then code images are produced in colors respectively allocated to the code values. In FIG. 2B, a code image is produced using 8 colors, and two consecutive cells are used to express one character or numeral. Code values "000" to "111" are allocated to 8 colors, respectively, and each character is encoded in two colors. For example, a number "3" is allocated as a code value "000 011", and encoded in a color (black) allocated to the code value "000" and a color (cyan) allocated to the code value "011", so that the number "3" is expressed using two consecutive cells of black and cyan. Various characters or numerals included in the target information are converted into code values according to the code conversion table shown in FIG. 2B, and then colors corresponding to the code values can be expressed in a rectangular matrix, that is, a combination of rectangular cells.

FIG. 2C shows an example of a code image produced using a grayscale code, according to the present invention. In the present invention, a character or numeral can be color-encoded and color-decoded using a color printer and a scanner. In FIG. 2C, a code image can be produced using a grayscale code, that is, shades ranging from black to white, depending on the purposes and circumstances of users.

A grayscale code forms a code according to the brightness of white from black instead of a mixture ratio of red, green and blue. Thus, the reference area is formed of at least one reference shade among black, white and gray, and the cells formed in the data area have code values obtained due to the gray difference between their colors and the reference shade of the reference area. This gray code image can usually be applied to black printing media such as newspaper.

FIGS. 2D and 2E show an example of a pattern that can be expressed in each of the cells of a code image. As can be seen from FIGS. 2D and 2E, a method of adding a pattern to a color cell using a vector line in addition to color can be adopted to convert information into a code image. FIG. 2D shows an example of 4-direction vector lines and 8-direction vector lines that can be expressed in a cell. If 4-direction vector lines are used, patterns of four bits, that is, 16 different patterns, can be added to the color of each cell, as shown in FIG. 2E. Accordingly, when one character is expressed for one cell, and 8 colors, that is, colors of 3 bits, are used, each cell can be expressed in 128 characters (characters of 7 bits). Also, a cell can be divided in horizontal, vertical and diagonal directions, and the divided cell pieces can be expressed in different colors or shades.

FIGS. 3A through 3F show various examples of the location of the parity area 13 of FIG. 1 within a rectangular matrix-type code image. Also, the configuration of these examples can be modified and applied to a code image having a circular shape or another shape. Area (Dn) except for the parity area (Pn) is a data area, a reference area or a control area.

In FIG. 3A, parity cells each having parity information on the cells in the same row are located at the rightmost column. For example, the parity cell for cells D11, D12, D13 and D14 is P1. In FIG. 3B, parity cells each having parity information on the cells on the same row are aligned in a diagonal direction. In FIG. 3C, parity cells each having parity information on the cells on the same column are located at the lowermost row. In FIG. 3D, parity cells each having parity information on the cells on the same column are aligned in a diagonal direction.

Figures 3F, 4:
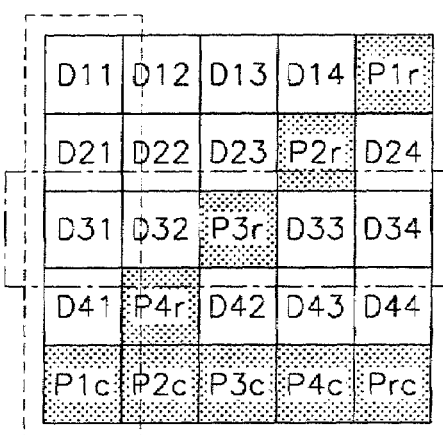

In FIG. 3E, parity cells P1r through P4r each having parity information on the cells in the same row are located at the rightmost column, and simultaneously, parity cells P1c through P4c each having parity information on the cells in the same column are aligned at the lowermost row. A parity cell Prc having parity information on the row parity cells and the column parity cells is further included. In FIG. 3F, a code includes the row parity cells P1r through P4r and the column parity cells P1c through P4c, as in FIG. 3E. Here, the row parity cells P1r through P4r are aligned in a diagonal direction. Conversely, the column parity cells P1c through P4c can be aligned diagonally.

An example of a method of selecting a color for a parity cell will now be described. A parity cell has a code value obtained by performing a XOR operation with respect to the code values of the data cells (undoubtedly, reference cells and control cells can be included) on the same row or column. When an even parity method is used, the result value of the XOR operation is directly the code value of a parity cell, so that the parity cell is expressed in a color for the obtained code value. When an odd parity method is used, the complement value (~) of each bit of the resultant value of the XOR operation is obtained, and the parity cell is formed in a color corresponding to the obtained complement value.

A method of obtaining a color to be expressed in a parity cell using the code conversion table shown in FIG. 2A will now be described. If the colors of the data cells D11, D12, D13 and D14 are black, red, green and green, respectively, the code values of the data cells are 11, 10, 01 and 01, respectively.

<Even Parity Method>

$11 \oplus 10 \oplus 01 \oplus 01 \oplus = 01(\text{green})$

<Odd Parity Method>

$11 \oplus 10 \oplus 01 \oplus 01 = 01 \rightarrow \sim 01 = 10(\text{red})$

Figure 6:
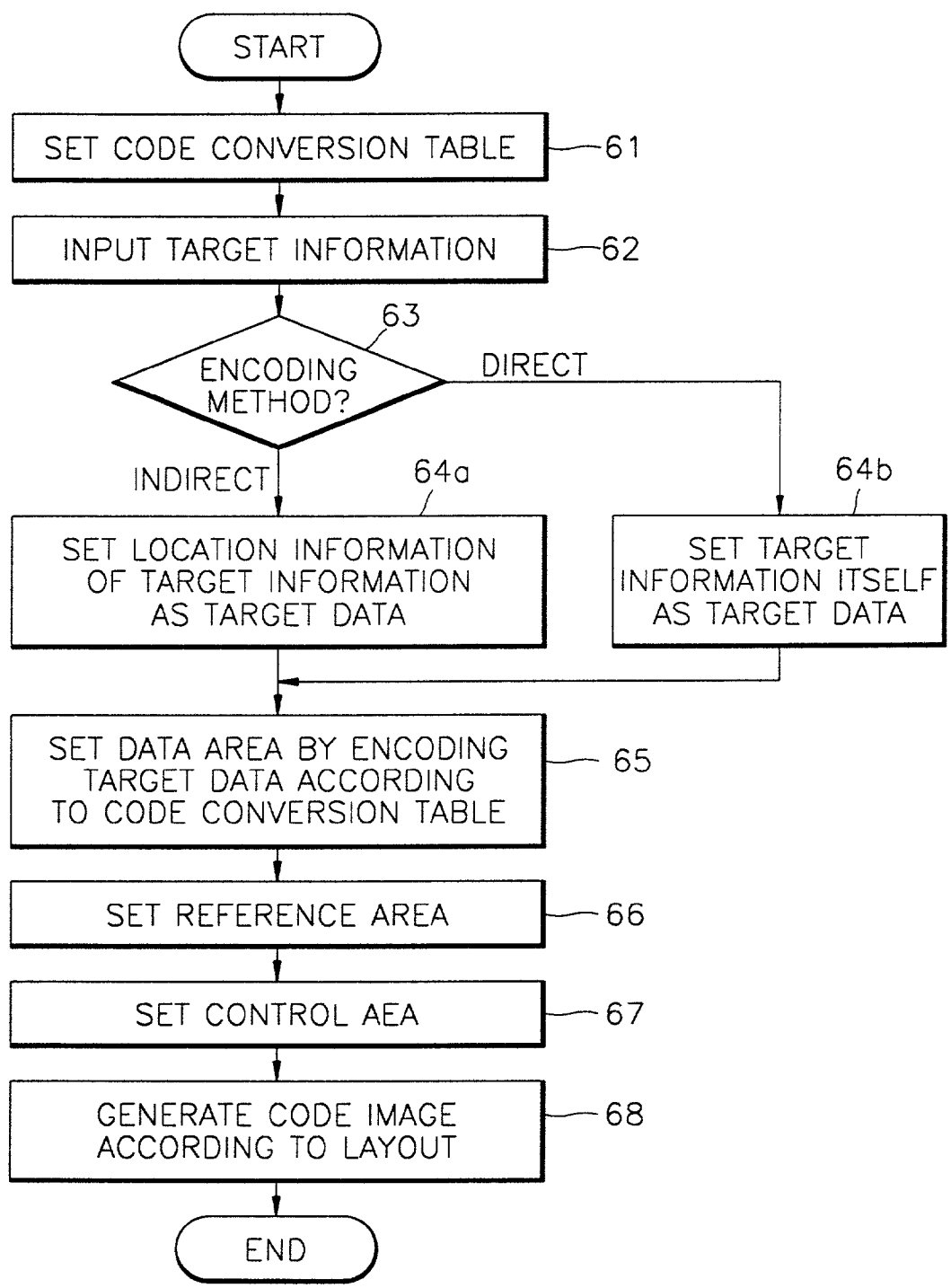
FIG. 6 is a flowchart illustrating a method of encoding information such as characters into a code image, according to an embodiment of the present invention.

FIG. 6 is a flowchart illustrating a method of encoding information such as characters into a code image, according to an embodiment of the present invention. A method of converting information into a code image using encoding software will now be described. At least one character or numeral included in target information is converted into a code image formed of a predetermined shape, color or pattern or a combination of the above-described features using a predetermined code conversion table as shown in FIG. 2B.

An encoding method may be a direct encoding method, an indirect (or index) encoding method or a mixed encoding method depending on the type of information encoded into a code image. In a direct encoding method, target information itself is directly encoded using a code conversion table, thereby producing a code image. In an indirect encoding method, index information (for example, the address of a database or a record number) for reference of target information is encoded into an image using a code conversion table. The mixed encoding method is a mixture of the two above-described methods.

In the direct encoding method of encoding target information itself into a code image, a separate system or storage is not required. However, when the amount of data of target information increases, the physical size of the code image increases.

In the indirect encoding method, target information itself is not encoded, but information on the position of a storage medium is encoded. This position information can be the pointer or memory address of a storage medium in which target information is stored, or the URL or IP address representing the position of target information. Thus, the indirect encoding method requires a separate system or a storage medium in which target information exists.

In the mixed encoding method, some indispensable data among the entire target information is directly encoded, and the other data is indirectly encoded. For example, names and telephone numbers are encoded character by character, large data such as mail addresses or E-mail addresses is stored in a server, and the memory address of the data stored in the server is encoded to produce a code image. Also, it is preferable that fixed data such as names adopt the direct encoding method, and variable information capable of being changed at any time, such as, home page addresses, telephone numbers or E-mail addresses, is indirectly encoded. Even when the personal items of a user are changed, a person who has received a business card on which a code image of the user is expressed can always access the latest information even with the old business card if the user registers the changed items in the database of a server.

Figure 5:
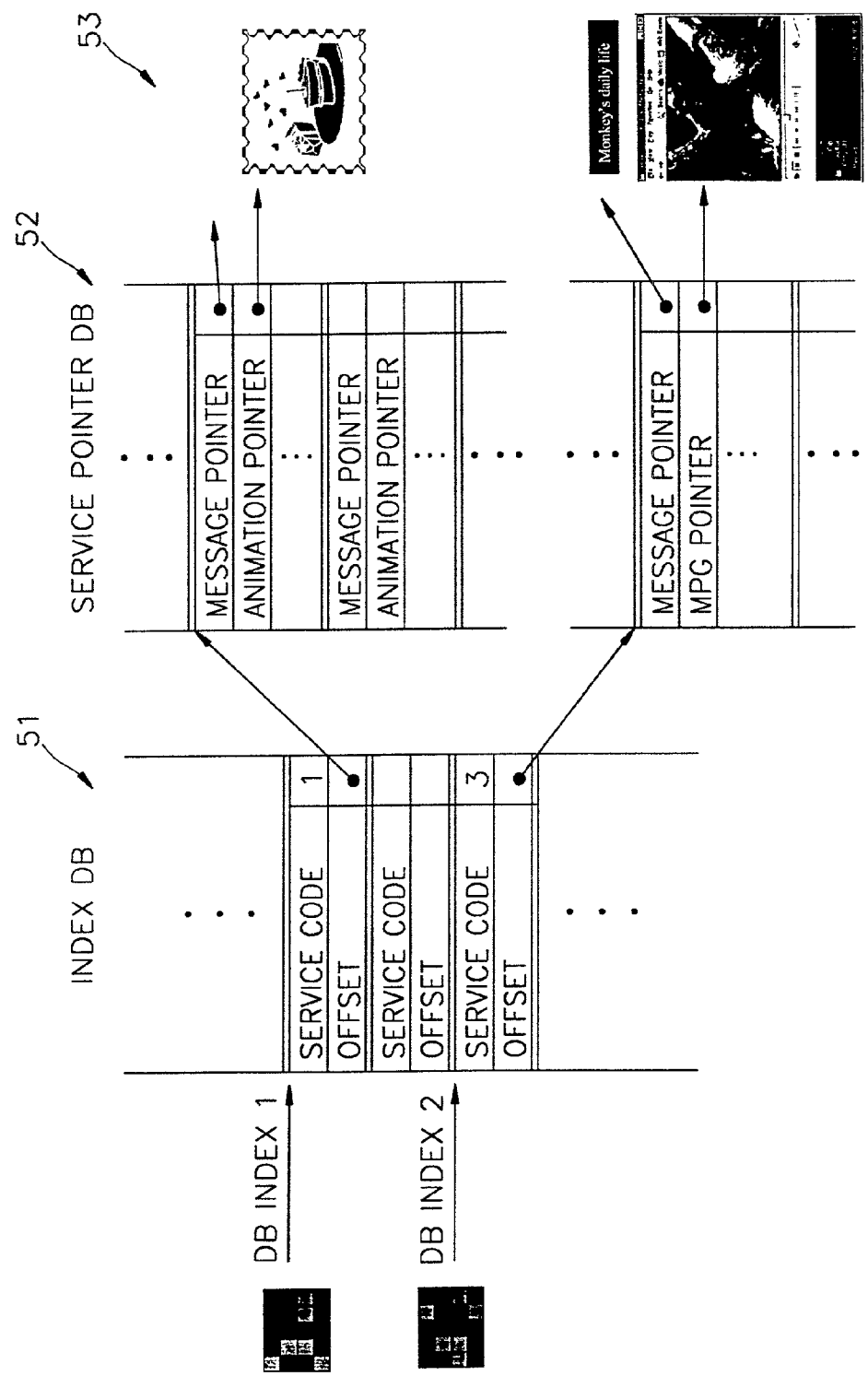
FIG. 5 illustrates a process for obtaining target information using index information read from a code image.

FIG. 4 shows the structure of a database which stores index information required when an indirect encoding method is applied to an encoding method according to the present invention. FIG. 5 illustrates a process for acquiring target information using index information read from a code image. In FIG. 5, a service pointer database 52 that stores pointer information capable of accessing real target information depending on index information is included together with an index database 51 as shown in FIG. 4. The pointer information indicates the position at which real target information 53 such as messages, images or moving pictures is stored.

A unique index is allocated to each real target information (content), and the service code and the offset, which correspond to target information, are set and stored together. Here, the target information, which is the final information capable of being eventually used by users, includes various types of information such as web site addresses, E-mail addresses, messages, images, moving pictures and music. A service code is designated depending on the type of service. For example, a web connection service and a telephone call service can be encoded into "1" and "2", respectively. The offset relates to information on a position at which the service pointer database 52 can be accessed. For example, if index information is read from a code image, the index database 51 is searched to extract the service code, offset and target information for the index information. Pointer information stored in the service pointer database 52 is searched for depending on the offset. The positions of preset messages or image files are found depending on the pointer information and the message or image is provided to users.

An encoding process will now be described referring to FIG. 6. A code conversion table on which colors or shades (or gray levels) are mapped corresponding to recognizable characters including numerals and symbols, is established, in step 61. An example of the code conversion table is shown in FIG. 2B, and a pattern (see FIG. 2E) using a vector line can be used in the code conversion table.

A user inputs target information to be converted into a code image, in step 62. Here, the user inputs his or her name, position, telephone number and facsimile number in order to encode, for example, personal items to be expressed on a business card, into a code image. It is common that a server stores information input by users in a database or file.

Next, it is determined whether to apply the direct encoding method of directly encoding target information or the indirect encoding method of indirectly encoding information on the position at which target information is stored in a data base, in step 63. If the direct encoding method is applied, the target information itself is set to be target data to be encoded, in step 64*b*. If the indirect encoding method is applied, the information on the position of the target information is set to be target data to be encoded, in step 64*a*. For example, if personal items (target information) themselves input by users are encoded, this corresponds to the direct encoding method. If database addresses at which the personal items are stored in a server, or indices associated with the addresses are encoded, this corresponds to the indirect encoding method. Also, a mixed encoding method, in which names are encoded by the direct encoding method and the other personal items are encoded by the indirect encoding method, can be applied.

The target data is encoded using a code conversion table, in step 65. Then, a code value for each of the characters or numerals included in the target data is obtained, a color or shade for each data cell is determined by the code value to form an image of each data cell, and imaged data cells are aligned in the order (or in a determined way) of alignment of characters or the like of target data, thereby completing a data area.

A reference area can be further set up by determining the shape, position or arrangement of reference cells in which a reference color or reference shade is to be expressed for providing a standard of interpretation of colors or shades expressed in the data cells of the data area. Also, a control area, in which control information where items associated with commands or services capable of being used using the target information included in the data area are set, can be further established.

Then, a parity value is obtained from the code values of colors or shades expressed in the data area or the like, and a color or shade for the parity value is set to be parity data, in step 66. At this time, an area in which the parity cell is to be located is determined (see FIG. 1 and FIGS. 3A through 3F).

When a data area and a parity area (if necessary, including a reference area or a control area) are set up, the layout of a code image including the shape of the code image, the relative position and size of each of the areas, and the size of a cell unit is set. A code image made up of a data area and a parity area (including a reference area and a control area if they exist) is produced according to the set layout, in step 68. The code image can be automatically output by the algorithm of a program, or manufactured by a graphic editor or by a manual operation according to a code conversion scheme. The code image formed in this way is expressed on a predetermined medium or stored in an image file.

Figure 7:
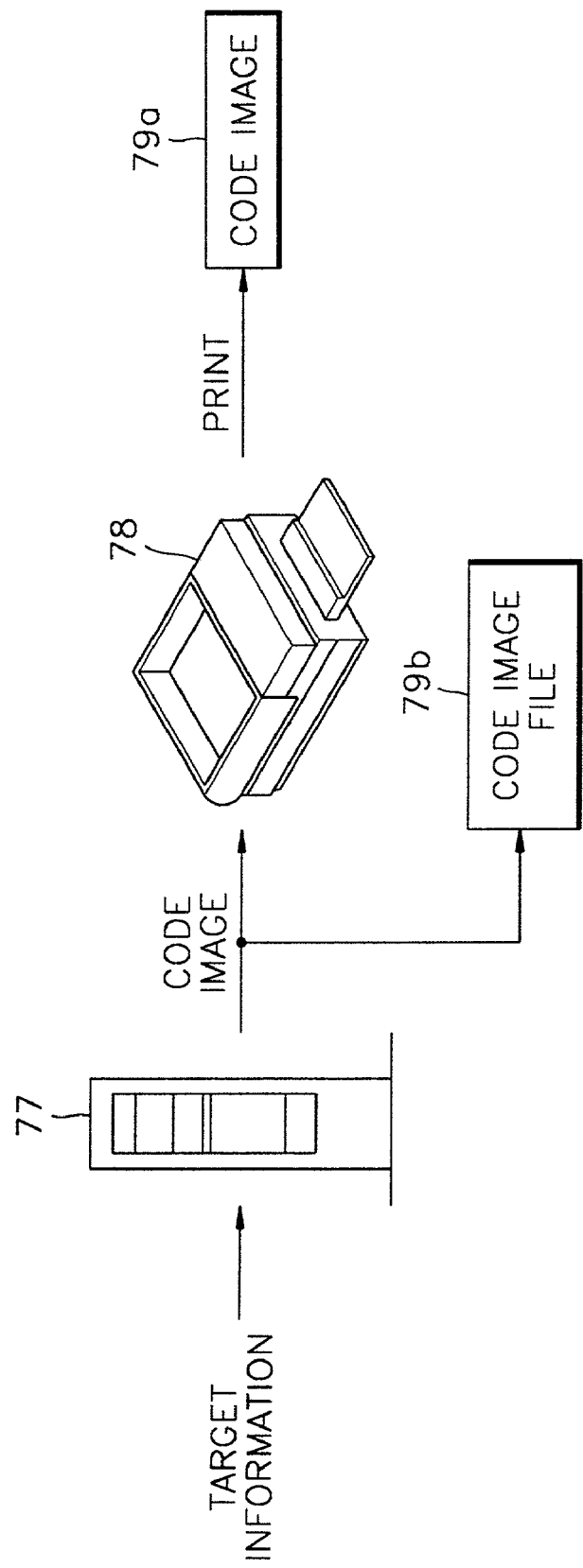
FIG. 7 shows an encoding system according to the present invention.

FIG. 7 shows an encoding system according to the present invention. In FIG. 7, a computer 77 receives target information, produces a code image through the above-described encoding process and prints the code image using a printer 78, so that the code image can be physically expressed on a medium 79*a* such as a business card or electronically provided in the form of a code image file 79*b*. Here, a medium on which a code image is expressed can be all media capable of expressing predetermined information, such as a business card, the exterior of products, the advertisement page of magazines and the like. Also, a code image can be output through a display device such as a monitor, stored in a computer file, or transmitted as an electrical signal to a communication line.

Figure 8A:
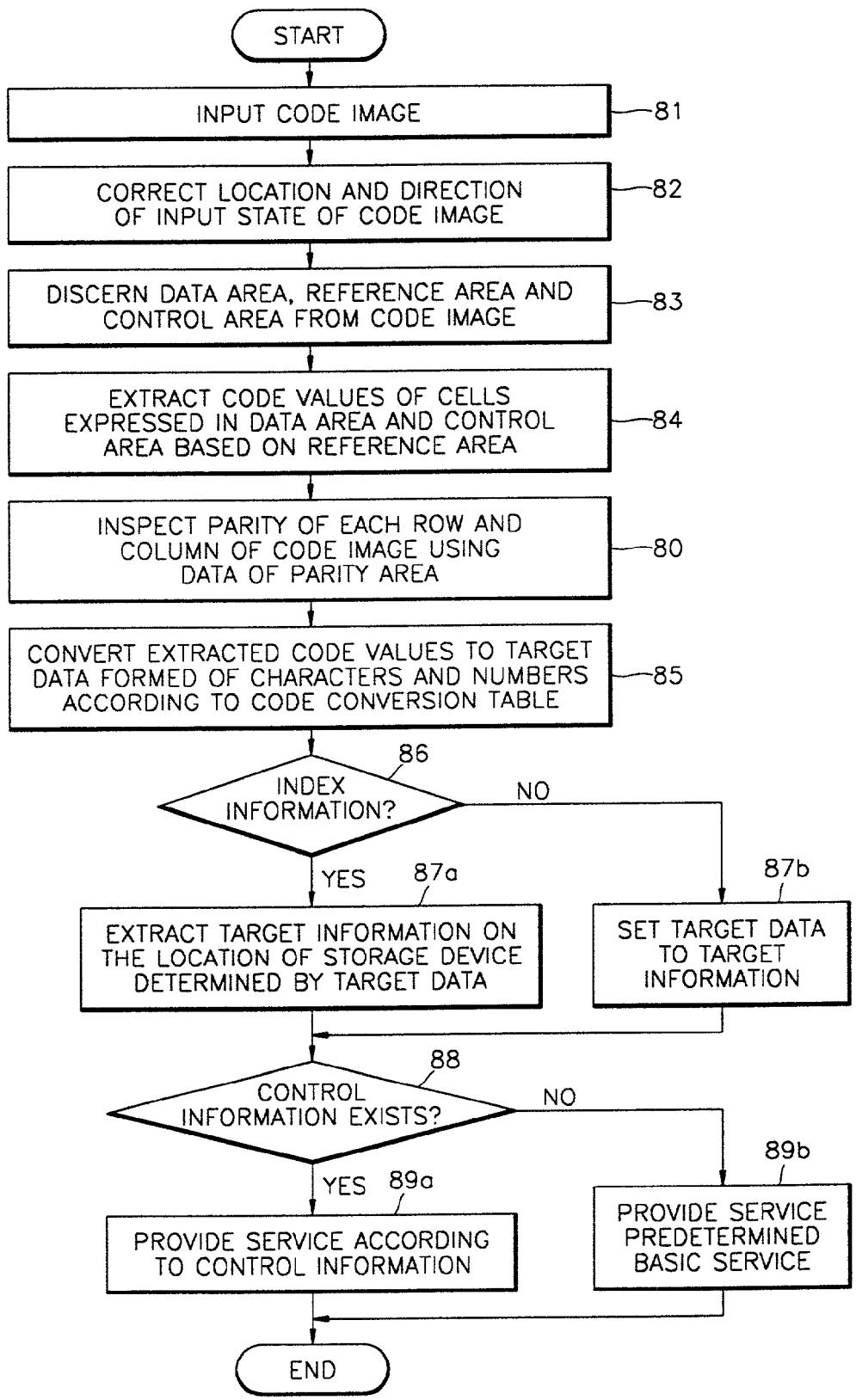
FIG. 8A is a flowchart illustrating a method of decoding a code image into target information, according to an embodiment of the present invention.
Figure 9:
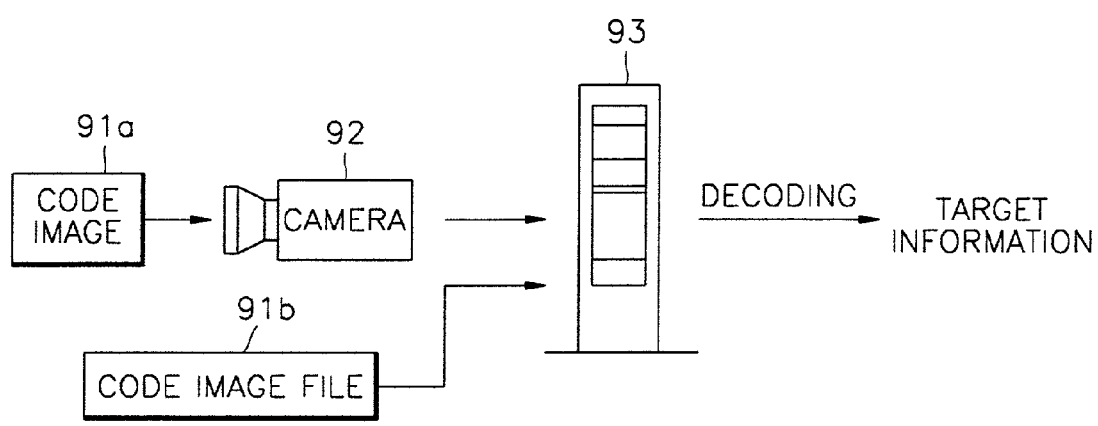
FIG. 9 shows a decoding system according to the present invention.

FIG. 8A is a flowchart illustrating a decoding method to extract the original target information made up of characters or the like from a code image, according to an embodiment of the present invention. In order to decode a code image of the present invention, an image input device 92 for reading a code image 91*a*, such as a scanner, a digital camera, a CCD camera, a sensor, a facsimile or the like, must be provided, or a code image must be provided in the form of a code image file 91*b* so as to be directly used by a computer 93, as shown in FIG. 9. Also, the computer 93 (a personal computer or a server computer connected to personal computers) must be able to execute a program for decoding code images.

Referring back to FIG. 8A, a code image made up of a data area and a parity area (including a reference area and a control area if they exist) is input to a user computer, in step 81. The user computer can directly receive the code image 91*a* expressed on a medium using an image input device, or can load the image file 91*b*, which has already been made, into its memory using a storage device such as a disc or buffer. In the case of a code image formed by an indirect encoding method, the user computer must be connected to a server having a storage device in which index information is stored, or must include such a storage device.

Sometimes, a code image may be read crookedly or aslant depending on the operating state of a scanner or the position on a medium at which the code image is printed. In this case, the code image may be decoded wrongly. Accordingly, the position or direction of the code image is corrected, in step 82.

A data area and a parity area in the code image are discerned from each other using the information in a boundary area set between areas or using particular information in a cell, in step 83. If a reference area and a control area are encoded together with the data area and the parity area, they are discerned from each other.

When a code image is recognized by a computer, a decoding process for extracting the original information from the code image is performed. Decoding denotes extraction of the original information from a code image according to what is defined in a code conversion table. Types of decoding methods include a direct decoding method and an indirect decoding method. In a direct decoding method, when a code image is decoded, actual target information such as names or addresses is directly extracted. In an indirect decoding method, a decoded result has index information, which is a key value for accessing a database in which actual target information such as names or addresses is stored.

Upon decoding, a process for finding shapes, colors, patterns and characters included in a code image is required, and a process for correcting distorted images is also required. Here, the colors can be discerned by at least one of an RGB (red, green, blue) model, an HSV (hue angle, saturation, value) model, a CMY (cyan, magenta, yellow) model and an HLS (hue angle, lightness, saturation) model.

In order to achieve decoding, if a reference area is also set up, the code values of the cells of a data area and a parity area (including the reference area and a control area if they exist) are extracted on the basis of the colors expressed in the reference area, in step 84. If a reference area exists, a color (or shade) is detected from a reference cell, and serves as a reference color (or reference shade) for interpreting the information in the data area. Colors are detected from the cells included in the data area, the parity area or the control area, and the color differences of the detected colors from the reference color are obtained and converted into the code values for cells. If there is no reference area, the code values for the cells can be obtained depending on colors or shades interpreted by an image input device.

The parity of each row or column of a code image is checked as to whether it has errors, using the code values obtained from the parity area, that is, parity data, in step 80. This step will be described later in greater detail referring to FIG. 8B.

The code value of each cell obtained through the above-described process is converted into target data made up of recognizable characters including numerals and symbols according to a code conversion table (see FIG. 2B), in step 85. The content of the target data obtained in step 85 is determined depending on the type of encoding method, in step 86. In step 87*a*, if a code image is encoded by the indirect encoding method, that is, if target data obtained by decoding is index data, target information stored at a position on a storage device (database) determined by the target data is extracted, since the target data corresponds to the address or pointer of a storage device in which target information is stored. If the target data is not index data, the target data serves as desired target information, in step 87*b*.

It is determined whether a code image includes a control area in which items associated with commands or services capable of being executed using target information are set forth, in step 88. If a code image includes the control area, commands or services are provided depending on information set forth in the control area, in step 89*a*. Otherwise, a basic service designated in a program is provided, in step 89*b*.

Figure 8B:
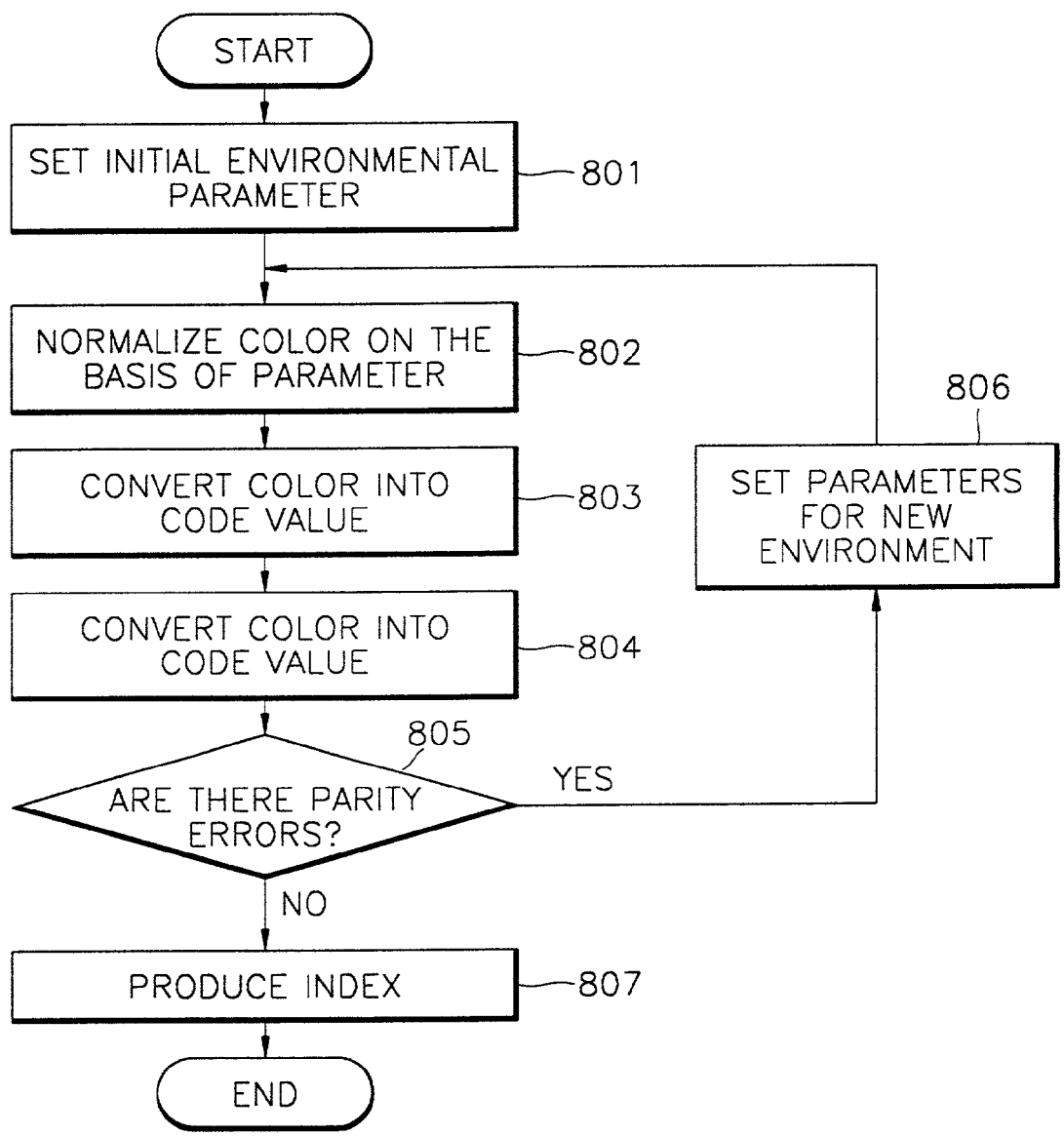
FIG. 8B is a flowchart illustrating the step 80 of FIG. 8A in greater detail.

FIG. 8B is a flowchart illustrating the step 80 of FIG. 8A in greater detail. In FIG. 8B, parity is inspected on the basis of the code values extracted in step 84, and colors are corrected according to the result of the parity inspection.

First, parameters for color interpretation are set in step 801. The parameters can be R, G and B in the RGB model, H, S and V in the HSV model, or a combination of the aforementioned features, and are set to normalize the code values of colors or shades recognized from a code image in consideration of the environment from which the code image has been read. Here, the parameters can be R, V and S values, that is, the R value obtained by the RGB model and the V and S values obtained by the HSV model. Generally, initial environmental parameters are set so as to be suitable for the most-widely used illumination environment, such as, fluorescent lamps or 3-wavelength lamps. Preferably, the parameters are set depending on the illumination environment when a white background is photographed using an image input device, before a code image is input. For example, since red light is relatively strong under the illumination of a halogen lamp, parameters are set so as to remove an influence of red light from a halogen lamp. Then, an actually-read color is normalized by the parameters, thereby reducing the effect of illumination and obtaining a color which is close to the original color.

Next, the R, G and B values of a color read from a code image are normalized on the basis of the parameters R, V and S, in step 802. A code value for a color depending on the normalized R, G and B values is obtained using a code conversion table, in step 803. A parity value is calculated using the code value of the cells on each column and/or row expressed in a data area (including a reference area and a control area if they exist), in step 804. In step 805, the calculated parity value is compared with the parity data of a parity cell set in units of columns and rows of the data area, to determine whether there are parity errors, in step 805.

If a parity error is generated on a column or row, parameters for a new environment are set in step 806, and then the step returns to the color normalizing step 802. Parameters optimized to an illumination environment of high frequency, and their weighted values, are pre-set and stored in a decoding program or a database, so that users can select an environment parameter which is the most suitable for their environments. Generation of parity errors can be considered as generation of errors in color interpretation using the currently-set parameters. Accordingly, in this case, colors are again read using other parameters.

The parameters are experimentally set in a parameter database so that a color read by an input optical device is corrected to the original color by analyzing the optical characteristics of the input optical device and its peripheral illumination circumstances. Thus, the effects of devices or an environment are excluded, so that colors can be recognized without errors. For example, when colors are discerned on the basis of the RGB model under a red illumination environment, an R value is relatively high. Thus, the effects of environments can be excluded by reducing the R value read by an optical device depending on a predetermined weighted value. In a case of a code image received under a bright illumination environment, black and white are discerned from each other on the basis of the HSV model by increasing the weighted value of a V value. In a case of a code image received under a dark illumination environment, colors are determined on the basis of the HSV model by increasing the weighted value of the V value which is used for discerning black and white from other colors and by increasing the weighted value of the S value.

Upon re-setting parameters, the distribution of R, G, B, H, S and/or V values obtained with respect to each of the cells of a code image by an optical device is ascertained, and parameters and their weighted values can be re-set with reference to the distribution.

Figure 10:
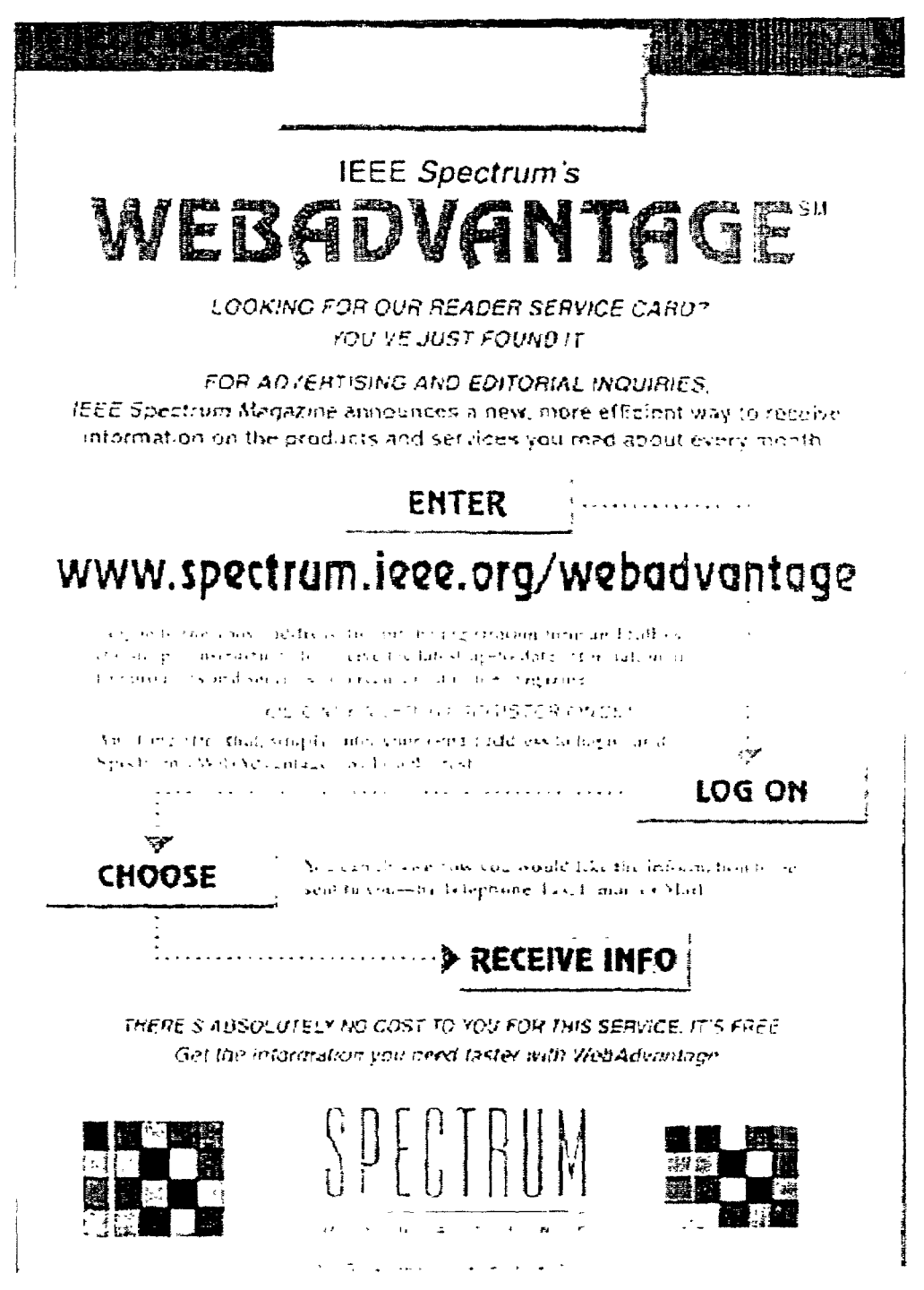

FIG. 10 shows an example of an advertisement paper on which a code image is printed according to the present invention. Users who see the advertisement paper of FIG. 10 can obtain information on a code image by scanning (or photographing) the code image (a rectangular matrix-type image displayed on the lower portion at the left and right sides of the advertisement paper) using an optical device such as a PC camera or a scanner.

In the present invention, a computer-readable code image can be stored in recording media that can be read by a computer. The computer-readable recording media may be any type of recording device that can be read by a computer system, such as, ROM, RAM, CD-ROM, magnetic tapes, floppy discs, optical data storage devices, and carrier waves (e.g., transmissions over the Internet). Also, the computer readable recording media can be distributed on computer systems connected through a network and can store and execute a computer readable code in a distributed mode.

As described above, since a code image according to the present invention includes a parity area for parity inspection, mal-recognition of colors due to the difference between input devices such as cameras or between the environments such as illumination conditions, can be easily detected and corrected. Thus, a more efficient decoding method and apparatus can be achieved using a code image according to the present invention.

According to the present invention, parity information together with target information is encoded into a code image according to a code conversion table, parity inspection is performed when the encoded code image is decoded, and environmental parameters are appropriately applied upon generation of parity errors, so that colors can be accurately recognized. In particular, even in an environment having normal brightness under a general fluorescent lamp, in a relatively dark or bright environment, and in an environment where red light is strong such as an environment under a halogen lamp, information on a code can be accurately recognized.

What is claimed is:

1. A code image decoding method comprising:
(a) receiving a code image including a data area in which target data is encoded and expressed as an image in colors or shades and a parity area for determining whether the image formed in the data area is suitable for the target data;
(b) discerning the data area and the parity area in the code image from each other;
(c) recognizing colors or shades from the images expressed in the data area and the parity area;
(d1) presetting and storing optimized parameters according to various illumination environments;
(d2) selecting a parameter among the optimized parameters in consideration of an environment where the code image has been read;
(e) normalizing a color or shade recognized from the code image on the basis of the selected parameter, and obtaining code values for the data area and the parity area;
(f) calculating a first parity value using the code values for the data area;
(g) calculating a second parity value using the code values for the parity area;
(h) determining whether there are no parity errors, by comparing the first parity value with the second parity value; and
(i) re-setting the parameter and repeating the above-described steps from the step (e), if parity errors are generated,
wherein in the step (i), when the parameters are reset, the distribution of colors or shades obtained from the cells of a code image is ascertained, and the parameters and their weighted values are reset with reference to the ascertained distribution.

2. The code image decoding method of claim 1, wherein the code image further includes a reference area in which a reference color or reference shade for providing a standard of interpretation of the colors or shades expressed in the data area is set forth, so that the colors or shades of the cells expressed in the data area are distinguished from each other on the basis of the reference color or reference shade expressed in the reference area.

3. The code image decoding method of claim 1, wherein the parameters in the step (d1) and/or in the step (d2) are R, G and B values in an RGB (red, green, blue) model, H, S and V values in an HSV (hue angle, saturation, value) model, or a combination of these values.

4. The code image decoding method of claim 1, wherein in step (d1), parameters are set depending on the illumination environment when a white background is photographed using an image input device, before a code image is received.

5. A code image decoding device comprising:
a storage unit for storing a code conversion table on which different colors or shades are mapped according to recognizable characters including numerals and symbols;
an input unit for receiving a code image including a data area in which target data is encoded and expressed as an image in colors or shades and a parity area for determining whether the image formed in the data area is suitable for the target data, the code image encoded according to the code conversion table;
an information discerning unit for distinguishing between a data area and a parity area of the code image and discriminating between the colors or shades of the cells expressed in the data area and the parity area to recognize colors or shades from the images expressed in the data area and the parity area;
a parity comparison unit for presetting and storing optimized parameters according to various illumination environments, selecting a parameter among the optimized parameters in consideration of an environment where the code image has been read, normalizing a color or shade recognized from the code image on the basis of the selected parameter to obtain code values for the data area and the parity area, calculating a first parity value using the code values for the data area and a second parity value using the code values for the parity area, comparing the second parity value with the first parity value to determine whether there is any parity error, and resetting the parameter and repeating the above-described functions from the normalizing function to the comparing function, if parity errors are generated; and
a data extraction unit for extracting target data made up of recognizable characters including numerals and symbols by decoding the received code image depending on the colors or shades recognized from the data area according to the code conversion table, if it is determined from the comparison by the parity comparison unit that there is no parity error;
wherein when the parameters are reset in the parity comparison unit, the distribution of colors or shades obtained from the cells of a code image is ascertained, and the parameters and their weighted values are reset with reference to the ascertained distribution.

6. A computer readable recording medium containing a program comprising the steps of:
(a) receiving a code image including a data area in which target data is encoded and expressed as an image in colors or shades and a parity area for determining whether the image formed in the data area is suitable for the target data;
(b) discerning the data area and the parity area in the code image from each other; (c) recognizing colors or shades from the images expressed in the data area and the parity area;
(d1) presetting and storing optimized parameters according to various illumination environments;
(d2) selecting a parameter among the optimized parameters in consideration of an environment where the code image has been read;
(e) normalizing a color or shade recognized from the code image on the basis of the selected parameter, and obtaining code values for the data area and the parity area;
(f) calculating a first parity value using the code values for the data area;

(g) calculating a second parity value using the code values for the parity area;
(h) determining whether there are no parity errors, by comparing the first parity value with the second parity value; and
(i) re-setting the parameter and repeating the above-described steps from the step (e), if parity errors are generated;

wherein in the step of (i), when the parameters are reset, the distribution of colors or shades obtained from the cells of a code image is ascertained, and the parameters and their weighted values are reset with reference to the ascertained distribution.

* * * * *